(12) United States Patent
Bradley (10) Patent No.: US 8,465,212 B2
(45) Date of Patent: Jun. 18, 2013

(54) CONNECTOR COVER FOR OUTSIDE PLANT APPLICATIONS

(75) Inventor: Kelvin B. Bradley, Lawrenceville, GA (US)

(73) Assignee: OFS Fitel, LLC, Norcross, GA (US)

(*) Notice: Subject to any disclaimer, the term of this patent is extended or adjusted under 35 U.S.C. 154(b) by 371 days.

(21) Appl. No.: 12/749,576

(22) Filed: Mar. 30, 2010

(65) Prior Publication Data
US 2011/0170829 A1    Jul. 14, 2011

Related U.S. Application Data

(60) Provisional application No. 61/293,470, filed on Jan. 8, 2010.

(51) Int. Cl.
*G02B 6/36* (2006.01)
*G02B 6/00* (2006.01)

(52) U.S. Cl.
USPC ............... 385/77; 385/53; 385/94; 385/136; 385/139

(58) Field of Classification Search
USPC ............... 385/53, 77, 78, 134, 136–139, 81, 385/92, 94
See application file for complete search history.

(56) References Cited

U.S. PATENT DOCUMENTS

| | | | |
|---|---|---|---|
| 5,007,701 A * | 4/1991 | Roberts | 385/53 |
| 5,151,962 A | 9/1992 | Walker et al. | |
| 6,899,467 B2 | 5/2005 | McDonald et al. | |
| 7,160,156 B2 | 1/2007 | Holliday | |
| 7,330,624 B2 | 2/2008 | Isenhour et al. | |
| 7,549,802 B2 | 6/2009 | Bell et al. | |
| 2003/0063868 A1 | 4/2003 | Fentress | |
| 2008/0273855 A1 * | 11/2008 | Bradley et al. | 385/139 |
| 2008/0298765 A1 * | 12/2008 | Cox et al. | 385/139 |
| 2008/0317415 A1 | 12/2008 | Hendrickson et al. | |
| 2009/0003793 A1 | 1/2009 | Bell et al. | |
| 2009/0148101 A1 * | 6/2009 | Lu et al. | 385/56 |

* cited by examiner

*Primary Examiner* — Kaveh Kianni
*Assistant Examiner* — Hung Lam
(74) *Attorney, Agent, or Firm* — Sutherland, Asbill & Brennan LLP (57) ABSTRACT

Certain embodiments of the invention may include apparatuses, systems, and methods for providing a connector cover for outside plant application. According to an example embodiment of the invention, a connector cover assembly is provided. The assembly can include an elongated hollow cylindrical cover having a closed first end, and open second end. The assembly includes a plug comprising an elastomeric material and having a plug first end, a plug second end, a bore extending through the plug from the plug first end to the plug second end, and a cover mating surface adjacent to the plug first end. The cover mating surface is operable to slidingly engage the cover, and the plug is operable to surround and slidingly engage optical fiber cordage extending through the bore.

22 Claims, 9 Drawing Sheets

CONNECTOR COVER FOR OUTSIDE PLANT APPLICATIONS

CROSS-REFERENCE TO RELATED APPLICATION

This application claims benefit of U.S. Provisional Application No. 61/293,470 filed Jan. 8, 2010, which is incorporated herein by reference in its entirety.

FIELD OF THE INVENTION

This invention generally relates to optical fiber connector covers for outside plant applications.

BACKGROUND OF THE INVENTION

Optical fiber networks often require robust, factory terminated, weather-resistant cable assemblies to reduce installation times and deployment cost. The cable assemblies are designed to withstand extreme temperature, moisture, chemical exposure, ozone, and other harsh environmental conditions. To help reduce deployment and installation costs, certain vendors offer pre-terminated outdoor bundle cable assemblies, allowing contractors to deploy multiple drops along the exterior of a multiple dwelling unit (MDU) and install one or more drops directly into the customer's premises after service has been ordered. This installation allows a significant increase in productivity, both during construction and installation, eliminates the need for costly interior path creation, and reduces the overall time to connect service to a particular unit.

Each bundle assembly deployed typically contains multiple coiled service drops, which can be positioned next to the windows of the MDU. The terminated ends of the service drops can be stored securely within each coil of cordage and the coils can hang outside the building until service is ordered. Therefore, the connectors need to be protected from outside-plant environmental conditions until service is ordered. In some cases, it may be years before service is ordered for a particular unit. Once service is ordered, the connector protection can be removed and the connector can be pulled through a hole drilled into the windowsill, to be connected to an Optical Network Terminal (ONT) located within the customer's residence. Currently, vendors that provide pre-terminated outdoor bundle cables for MDU applications typically protect the optical connectors using covers or caps secured to the connector with mastic or electrical tape. The tape is usually wound around the open end of the caps and the cordage to seal out moisture. While this approach may be acceptable, it is not an optimal solution for at least the following reasons: (1) it is time consuming to install the tape; (2) the application consistency of the tape is difficult to control (3), the tape adhesive may be adversely affected by the environmental conditions and sealing may be compromised; and (4) when the cover is removed, residue from the tape adhesive could be left on the connector components and/or cable.

Other connector cover concepts have been described in the patent literature. For example, U.S. Pat. No. 7,549,802 B2 (Jun. 23, 2009) describes a covering assembly that utilizes a bayonet restraining mechanism for attaching an end cap to a cover. The patent also describes a method for sealing the cover by using a sealing gasket. Also, U.S. Patent Application No. 2008/0317415A1 (Dec. 25, 2008), submitted by OFS, describes another covering assembly having a pulling eye in the cap. The above patent application describes two methods for attaching a cap to an adaptor. On method utilizes a bayonet restraining mechanism, and another method utilizes threads. The patent also describes a method for sealing the region between the cap and adaptor by utilizing an o-ring. Notwithstanding the foregoing solutions, a need remains for improved systems and methods for providing protective covers for optical fiber connectors.

BRIEF SUMMARY OF THE INVENTION

Some or all of the above needs may be addressed by certain embodiments of the invention. Certain embodiments of the invention may include systems and methods for providing connector covers for outside plant applications.

According to an example embodiment of the invention, a connector cover apparatus is provided. The apparatus includes an elongated hollow cylindrical cover having a closed first end, and open second end. The apparatus also includes a plug made from an elastomeric material, the plug having a plug first end, a plug second end, a bore extending through the plug from the plug first end to the plug second end, and a cover mating surface adjacent to the plug first end. The plug cover mating surface is operable to slidingly engage the cover, and the plug is operable to surround and slidingly engage optical fiber cordage extending through the bore. In example embodiments of the invention, the plug cover mating surface is operable to mate with and securely seal the cover second end by an interference fit.

According to another example embodiment, a system is provided. The system includes, an optical fiber, optical fiber cordage protecting the optical fiber, an optical fiber connector terminating the optical fiber, an elongated hollow cylindrical cover having a closed first end, and open second end and operable to surround the optical fiber connector. The system also includes a plug made of an elastomeric material and having a plug first end, a plug second end, a bore extending through the plug from the plug first end to the plug second end, and a cover mating surface adjacent to the plug first end. The plug cover mating surface is operable to slidingly engage the cover, and the plug is operable to surround and slidingly engage the optical fiber cordage extending through the bore.

According to another example embodiment, a method is provided for protecting an optical fiber connector. The method includes installing a plug on optical fiber cordage, where the optical fiber cordage protects the optical fiber. The plug is made from an elastomeric material and includes a plug first end, a plug second end, a bore extending through the plug from the plug first end to the plug second end, and a cover mating surface adjacent to the plug first end. The plug cover mating surface is operable to slidingly engage a cover. The method also includes terminating the optical fiber with the optical fiber connector, sliding the cover over the optical fiber connector and engaging the plug, and securing the plug to the optical fiber cordage.

Other embodiments and aspects of the invention are described in detail herein and are considered a part of the claimed invention. Other embodiments and aspects can be understood with reference to the following detailed description, accompanying drawings, and claims.

BRIEF DESCRIPTION OF THE FIGURES

Reference will now be made to the accompanying tables and drawings, which are not necessarily drawn to scale, and wherein.

DETAILED DESCRIPTION OF THE INVENTION

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Certain embodiments of the invention may provide a connector cover assembly for protecting a connector terminating an optical fiber. According to example embodiments, the assembly may include a cover sized to accept a plug and an optical fiber connector with a grip and/or shroud in place. The assembly may also include a plug and a clamp. In an example embodiment, the optical fiber connector may be installed on optical fiber, and the optical fiber may be protected by the cordage. In certain example embodiments, the cordage may be approximately 4.8 mm in diameter; however, other cordage diameters may be used without departing from the invention. According to example embodiments, the clamp and plug may be slid onto the cordage prior to terminating the optical fiber with the connector. The connector may then be installed using standard procedures. The connector may then be inserted into the open end of the cover resulting in a reliable environmental seal at the cover-plug interface. The clamp may be placed over the small end of the plug and secured so that the plug is secured to the cordage, and so that the plug forms a reliable environmental seal at the plug cordage interface.

According to example embodiments of the invention, the plug may be made from an elastomeric material. In certain embodiments, the cover may also be made from an elastomeric material. The elastomeric material may be natural or synthetic rubber or rubberoid material, which has the ability to undergo deformation under the influence of a force and regain its original shape once the force has been removed. Other rubbers including Neoprene, ethylene propylene (EPDM), fluorosilicone, fluorocarbon, silicon rubber, etc., can be used depending on the environmental and cost constraints. In an example embodiment, the plug and/or cover may be made from molded rubber. According to an example embodiment, the plug may have a Type-A Shore durometer hardness ranging from about 30 to about 80. In one example embodiment, the cover may have a similar durometer as the plug. In other embodiments, the cover may have a different durometer compared to the plug durometer. For example, the cover may have a higher durometer than the plug.

According to example embodiments, the elastomeric plug may be deformed surround and securely attach to the optical fiber cordage, and the plug may be held in place by a clamp. In certain example embodiments, the clamp may be a cable tie, a bolt clamp, a snap grip clamp, a spring clamp, or a hose clamp. The clamp may be made of a material that is resistant to environmental degradation. For example, the clamp may be made form heat-stabilized and/or ultraviolet (UV) stabilized nylon.

According to example embodiments of the invention, a reliable moisture barrier is provided via an interference fit between the smooth internal surface of the cover and the smooth external surface of the elastomeric plug. According to example embodiments of the invention, the clamp may provide additional circumferential compression of the inner diameter of the plug over the cordage outer diameter, which may seal the plug against the cordage. In accordance with example embodiments of the invention, the friction and/or interference fit between the elastomeric components may keep the cover in place on the plug. Accordingly, the elastomeric components may ensure reliable sealing through a wide range of temperature and environmental conditions.

Unlike cover concepts that utilize tape to secure the cover, embodiments of the invention may enable the cover to securely protect the connector, but to also be easy to remove, when desired. Furthermore, when a particular unit on the premises is ready for service installation, the clamp can be loosed and the plug can be slid up the cordage. The cable can be fed through an installation hole drilled in the windowsill, through which the connector may be pulled inside the dwelling hole. The plug may then be slid down the cordage into the installation hole, where it may help seal the installation hole. Since no tape is used, there will be no adhesive residue present on the cordage or connector after the cover assembly is removed.

Figure 1:
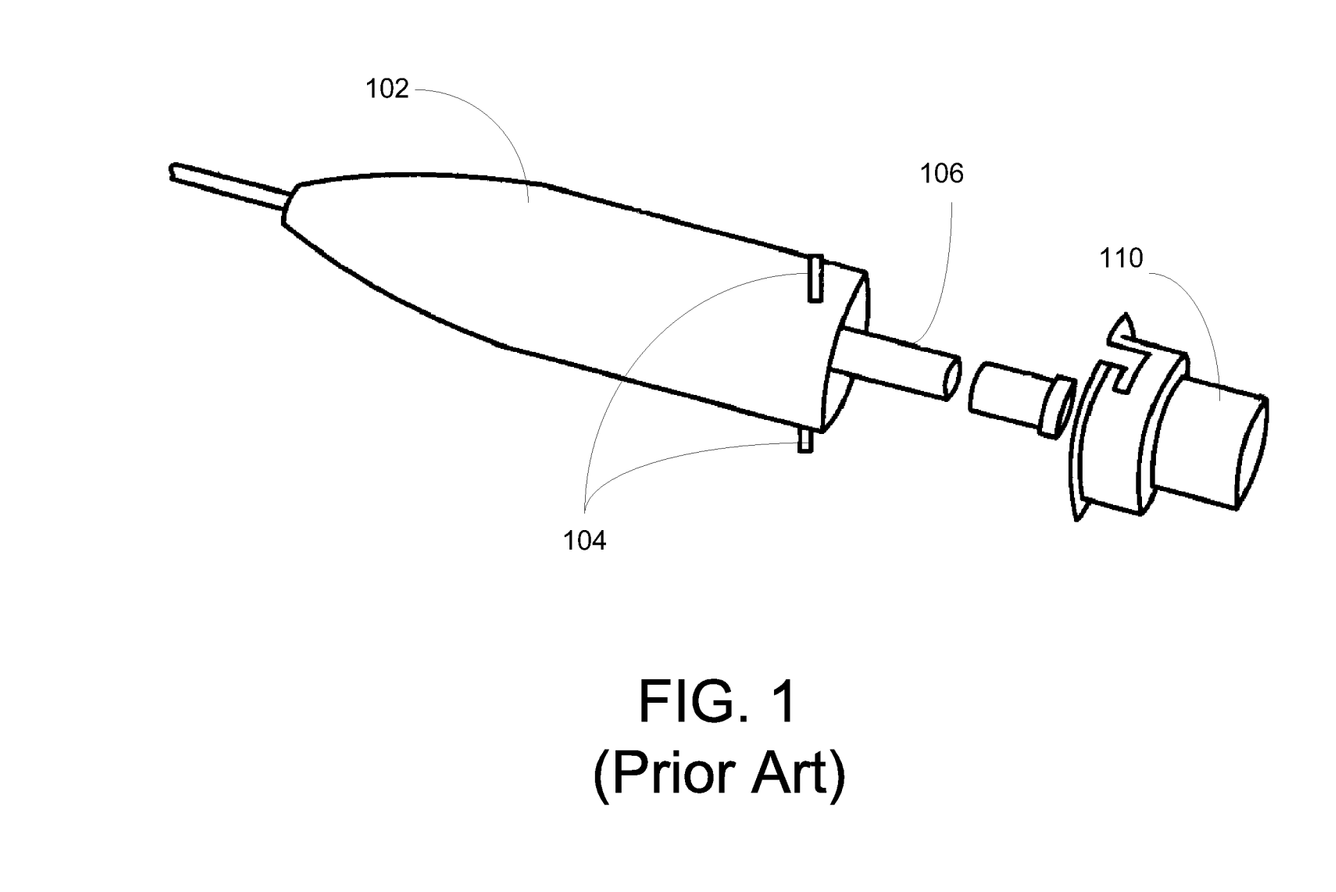
FIG. 1 is a diagram of a prior art connector cover.

Embodiments of the invention utilize an interference fit to attach the cover to a plug, and the plug/cordage interface may be secured and sealed with a clamp. These example embodiments are unlike the prior art cover as shown in FIG. 1, which illustrates a bayonet restraining mechanism 104 for attaching an end cap 110 to a cover 102. The prior art also utilizes a sealing gasket inside the cap to seal the cap/cordage interface, but the prior art does not disclose a clamping means to further secure and seal this interface.

Figure 2:
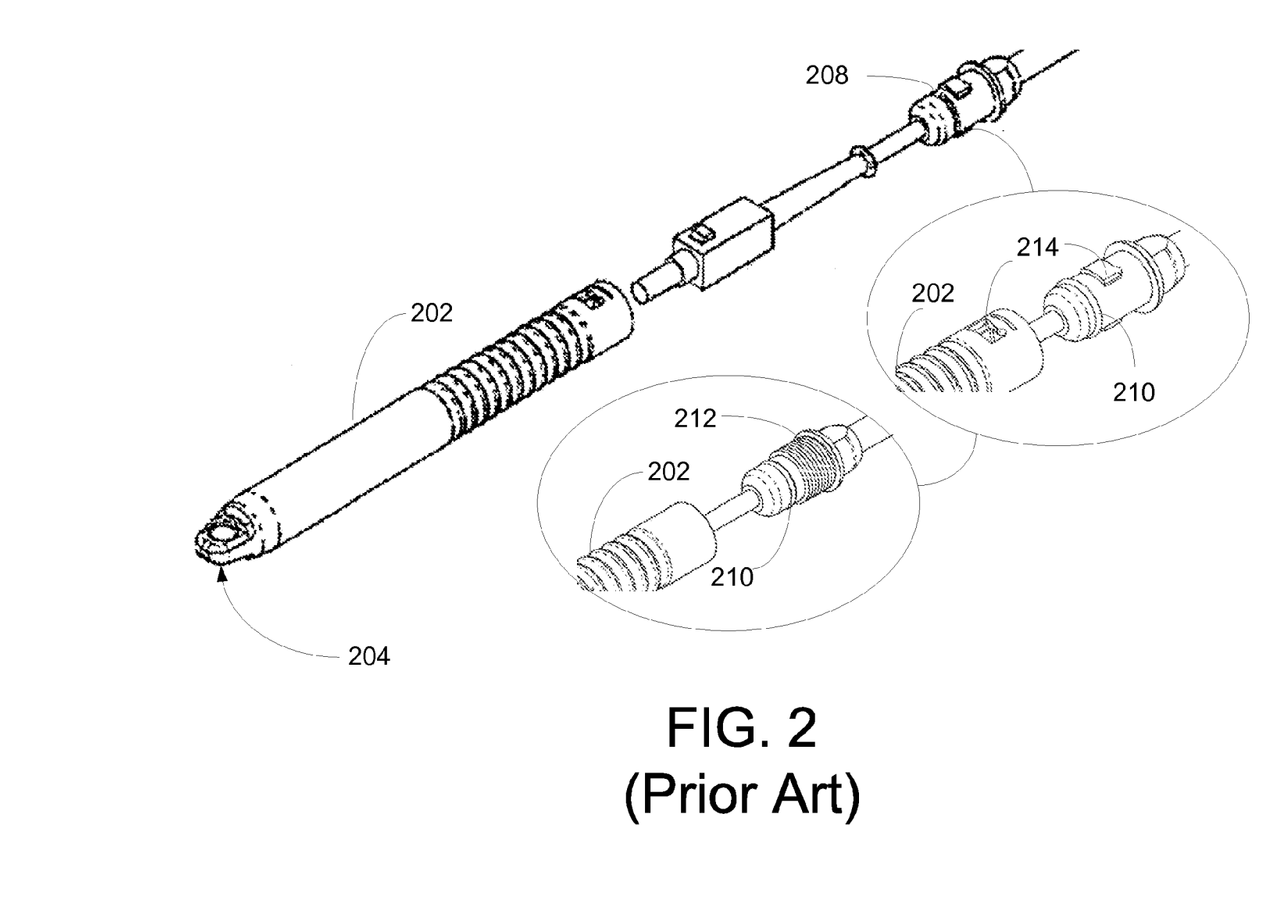
FIG. 2 is a diagram of a prior art connector cover.

Embodiments of the invention also differ from the prior art cover as shown in FIG. 2. For example, the prior art shown in FIG. 2 includes a pulling eye 204 in the cover 202, a bayonet 214 or thread 214 mechanisms in the cover 202 and the cable adaptor 208, and an o-ring 210, none of which are required in embodiments of the invention.

Various components and parts for providing the connector cover assembly and system, according to example embodiments of the invention, will now be described with reference to the accompanying figures.

Figure 3:
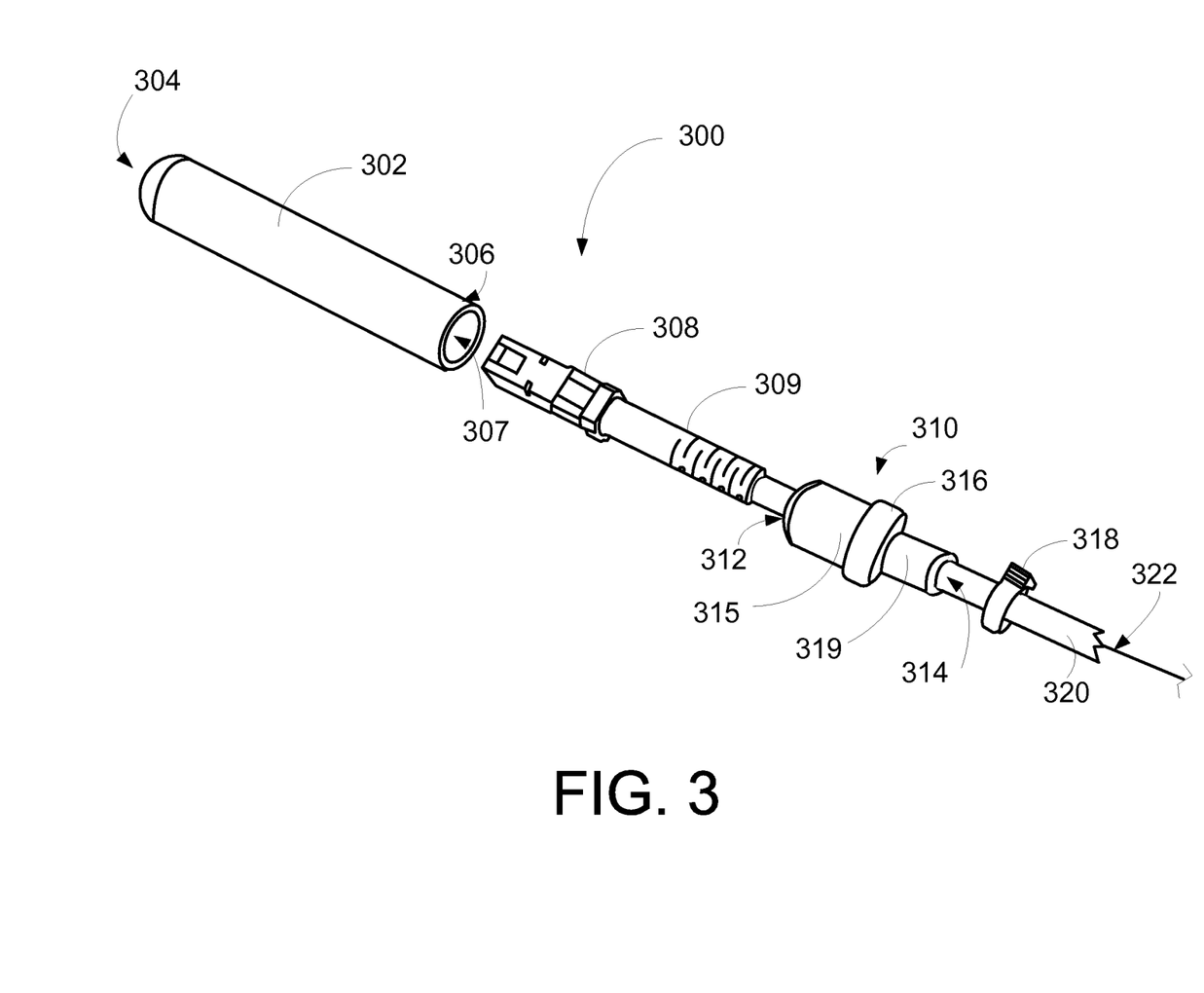
FIG. 3 is an exploded perspective view of connector cover components, according to an example embodiment of the invention.

According to example embodiments of the invention, FIG. 3 illustrates an exploded perspective view of connector cover system including cover assembly 300 components. The assembly may provide protection for a connector-terminated optical fiber, which may include an optical fiber 322 that may be covered by optical fiber cordage 320. A connector 308 may terminate the optical fiber 322, and in some embodiments, a connector grip/strain relief 309 may be part of the connector 308 assembly. According to example embodiment of the invention, the connector cover assembly 300 includes a cover 302, a plug 310, and a clamp 318. According to other embodiments of the invention, a system may include the cover 302, plug 310, clamp 318, optical fiber 322, optical fiber cordage 320 protecting the optical fiber 322, and an optical fiber connector 308 terminating the optical fiber 322.

The cover 302 portion of the system or assembly 300 may be comprised of an elongated hollow cylindrical cover 302 having a closed first end 304, and open second end 306. According to example embodiments, the cover 302 includes an aperture 307 adjacent to the second end 306 that provides enough clearance for the cover 302 to slide over and protect the connector-terminated end of the optical fiber cable.

The plug 310 portion of the assembly 300 includes a plug first end 312, a plug second end 314, and a bore (which is described below in more detail with reference to FIG. 5) extending axially through the plug 310 from the plug first end 312 to the plug second end 314. According to example embodiments of the invention, the plug 310 may include a cover mating surface 315 adjacent to the plug first end 312 for forming an interference fit with the cover 302 when the cover 302 is slid over the connector-terminated end of the optical fiber cable. According to example embodiments, the plug 310 is operable to surround and slidingly engage the optical fiber cordage 320 extending through the bore.

According to example embodiments of the invention, the plug 310 may also have a clamp surface 319 adjacent to the plug second end 314, where the clamp surface 319 is operable to have a clamp 318 slide on and engage the clamp surface 319 for sealably securing the plug 310 to the optical fiber cordage 320. According to example embodiments, the clamp may be a cable tie, a bolt clamp, a snap grip clamp, a spring clamp, or hose clamp. Other types of securing devices may also be used for radially compressing the clamp surface 319, and for securing the plug 310 to the optical fiber cordage 320 after the plug 310 has been properly positioned with respect to the connector-terminated optical fiber.

In accordance with example embodiments of the invention, the plug 310 may further include a flange 316 positioned approximately mid-way between the plug first end 312 and the plug second end 314. The flange 316 may be operable to define boundaries between the clamp surface 319 and the cover mating surface 315. In example embodiments, the flange 316 may further provide additional sealing for the cover second end 306 when the cover is engaged with the plug 310.

Figure 5:
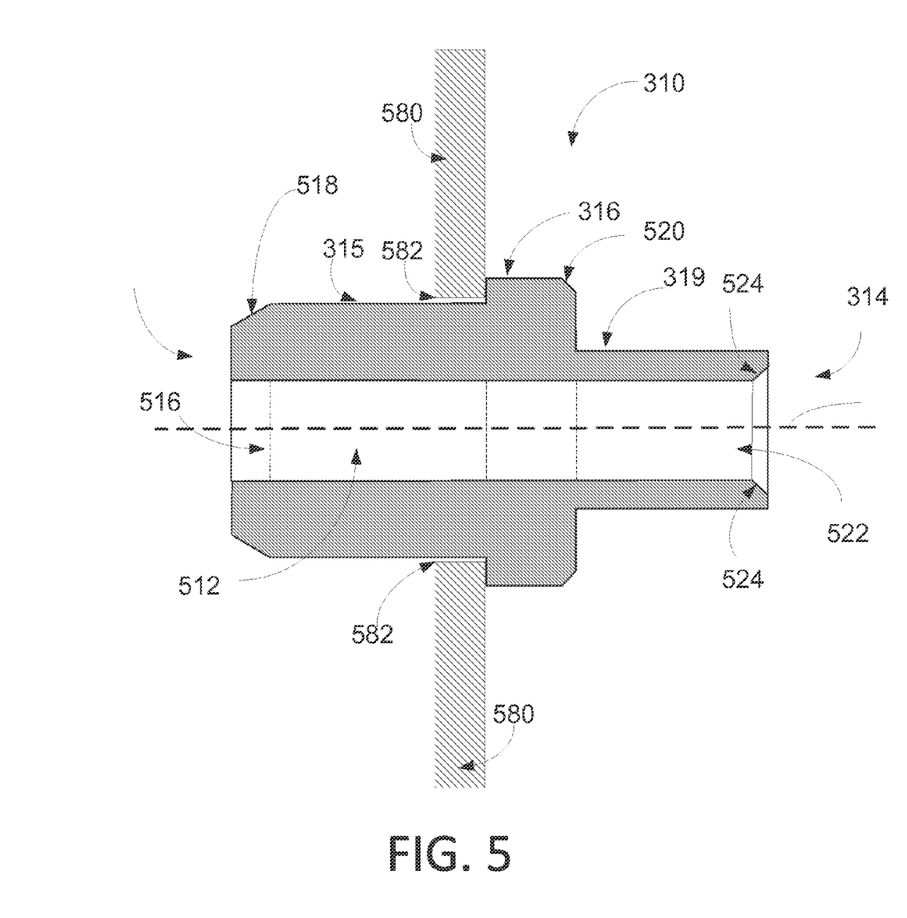
FIG. 5 is a cross sectional view of the plug, according to an example embodiment of the invention.

In certain example embodiments, the plug 310 may also perform a secondary function after the connector-terminated optical fiber is installed in the premises. For example, as shown in FIGS. 3 and 5, when an installation hole 582 is drilled in the window seal or wall 580 of a premises, and the connector-end of the cable is to be threaded through the hole, the clamp 318 may be disengaged from the plug 310, allowing the clamp 318 and the plug to slide down the cordage 320, and away from the connector-terminated end of the cable. The connector-terminated end of the cable may then be inserted through the installation hole 582. Once the cable is appropriately "fished" into the premises, the plug 310 may then be slid along the cable, back towards and into the installation hole 582 to provide further sealing of the installation hole 582 from the outside environment, for example. The clamp 318 may then be secured around the clamp surface 319, if appropriate, to further secure the plug 310 to the cordage 320. In other embodiments of the invention, the plug 310 may be removed from the cordage by slicing or cutting through the plug 310 body along the axial direction to the bore 522 using scissors or a knife.

According to an example embodiment of the invention, the cover 302 may be made from a rubber material or a rubber-like material. According to an example embodiment of the invention, the plug 310 may also be made from a rubber material or a rubber-like material. In example embodiments, other materials may be utilized that impart stretching and compression in the components with minimal permanent deformation. For example, Neoprene, ethylene propylene (EPDM), fluorosilicones, fluorocarbons, etc, or combinations of like materials may be utilized.

Figure 4:
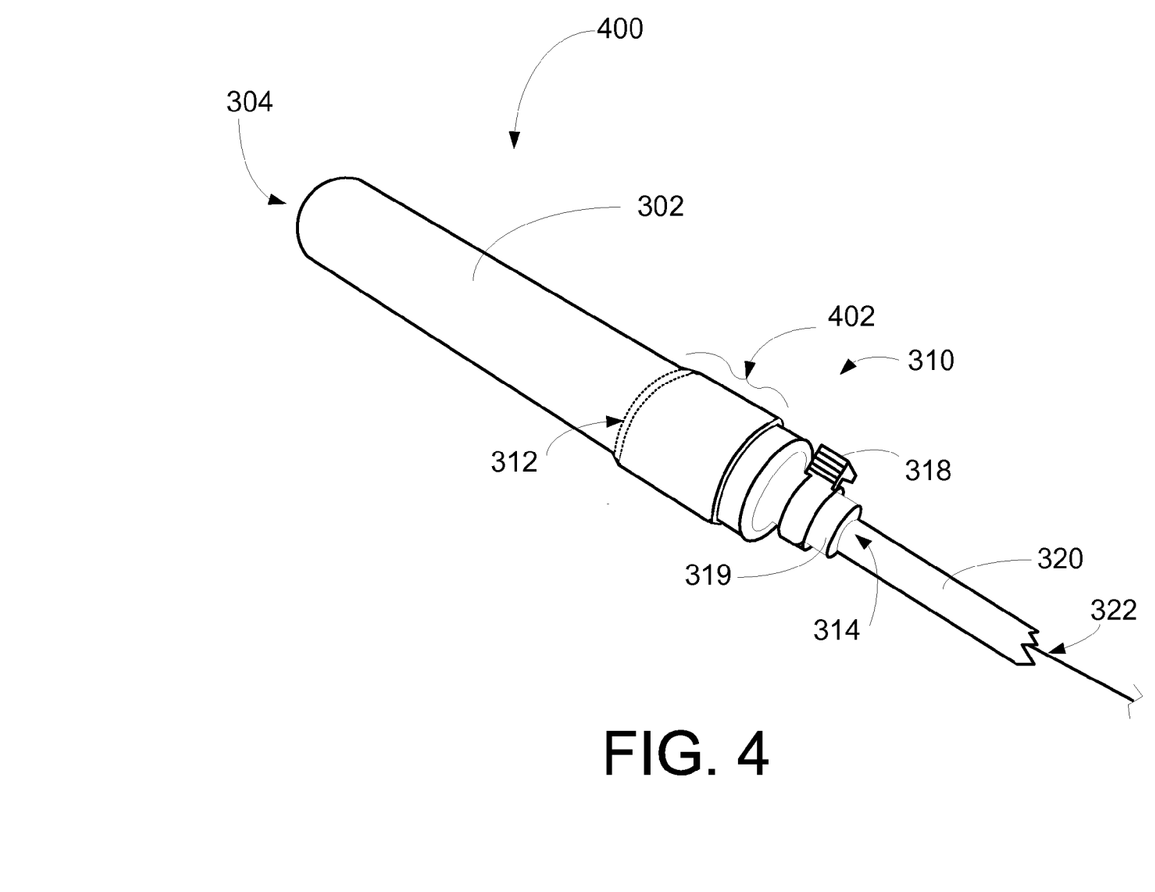
FIG. 4 is a perspective view of an assembled connector cover, according to an example embodiment of the invention.

FIG. 4 shows an example perspective view of an assembled connector cover assembly 400. According to an example embodiment, the cover 302 may slidingly engage with the plug 310 to form an interference fit 402 at the cover mating surface 315 from approximately the plug first end 312 (shown in phantom lines) to approximately the flange 316. According to example embodiments, the diameter of the plug's cover mating surface 315 may be larger than the inner diameter of the cover 302. Therefore, the interference fit 402 is indicated to show that the cover 302 may optionally expand to slide onto and engage with the plug 310. In other embodiments of the invention, the cover 302 may form a friction fit with the plug 310 without appreciable expansion.

FIG. 5 shows a plug 310 cross sectional view, according to an example embodiment of the invention. As mentioned above with reference to FIG. 3, the plug 310 may include a plug bore 512 extending axially through the center of the plug 310, and co-axial along a longitudinal axis 514 extending from the first end 312 to the second end 314 of the plug 310. According to example embodiments of the invention, the plug 310 may include a first end aperture 516, and a second end aperture 522.

In certain embodiments, the plug 310 may have additional features to facilitate insertion of the plug 310 into the cover 302, allowing the cover 302 to more easily engage with the cover mating surface 315. For example, the plug 310 may include a first end conical taper 518, where the outer diameter of the conical taper 518 at the plug first end 312 surface may be smaller than the inner diameter of the cover 302 at the cover second end 306. Certain example embodiments of the plug 310 may also include a second end aperture conical taper 524 on the inner diameter of the bore 512 for facilitating the insertion of cordage into the plug second end 314. The plug 310 may also include an optional flange conical taper 520 on the plug flange 316, towards the plug second end 314. The flange conical taper 520 may help reduce binding of the plug 310 or the assembly 400, for example, when the assembly 400 is being pulled by the cordage 320 in the direction of the plug second end 314.

Figure 6:
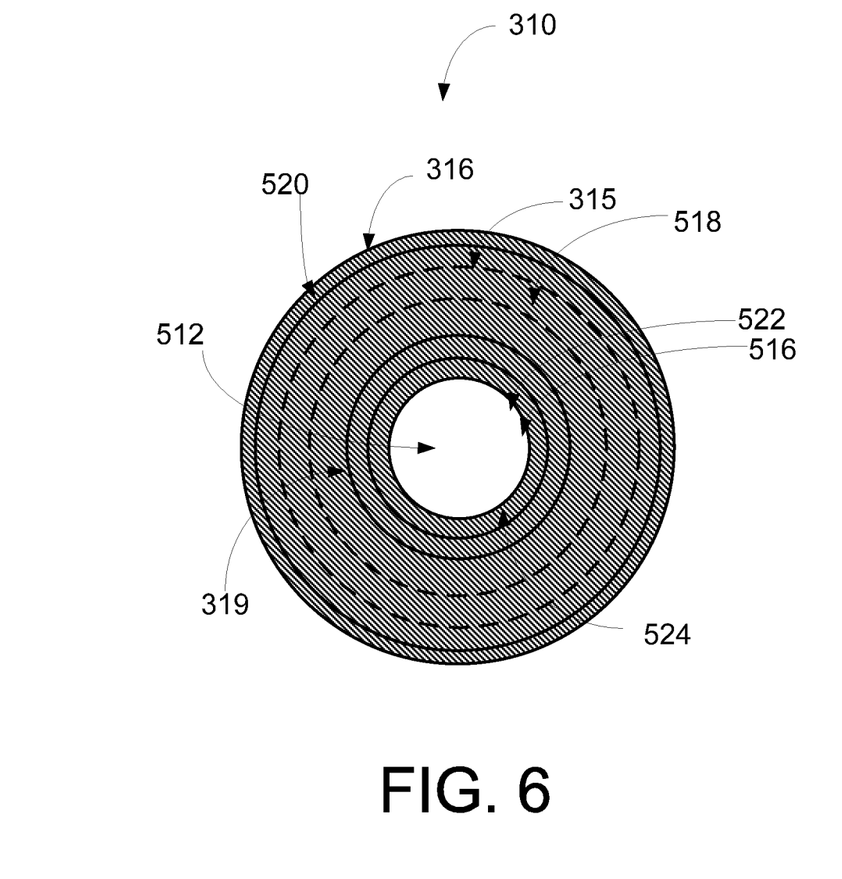
FIG. 6 is a second end view of the plug, according to an example embodiment of the invention.

FIG. 6 shows a plug 310 end view (as viewed from the plug second end 314), according to example embodiments of the invention. FIG. 6 indicates features of the plug 310 according to example embodiments. For example, the plug may include one or more of a plug bore 512, a first end aperture 516, a second end aperture 522, a second end aperture conical taper 524, a plug clamp surface 319, a first end conical taper 518, a cover mating surface 315, a flange conical taper 520, and/or a plug flange 316.

Figure 7:
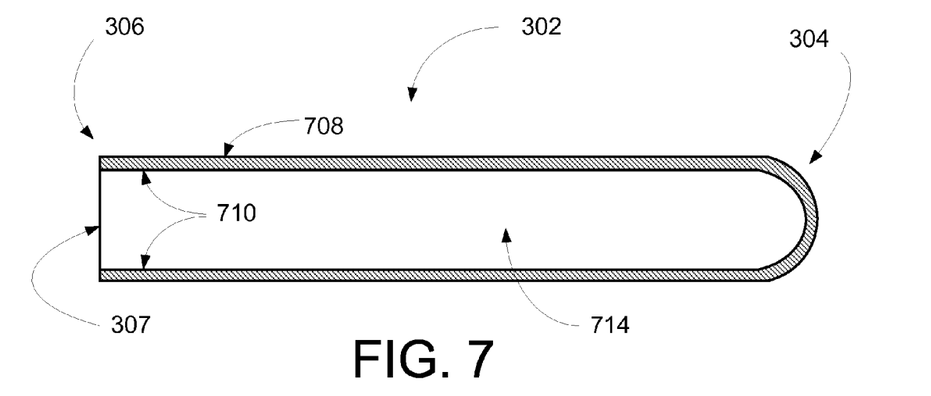
FIG. 7 is a cross sectional view of the cover, according to an example embodiment of the invention.
Figure 8:
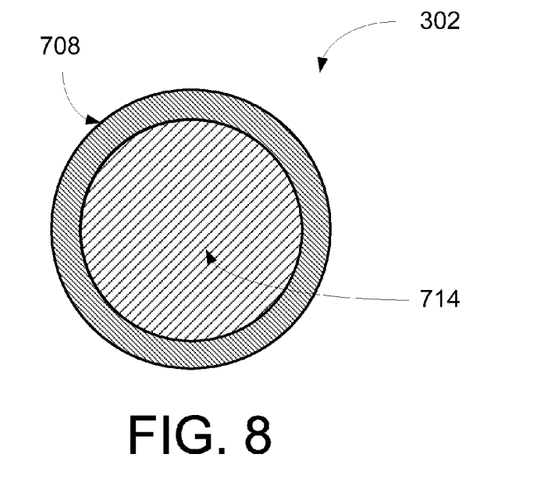
FIG. 8 is a second end view of the cover, according to an example embodiment of the invention.

FIG. 7 shows a cross sectional view of cover 302. According to example embodiments, the cover 302 includes a cover outer surface 708, an plug mating surface region 710 operable to form an interference fit or friction fit with the cover mating surface 315 on the plug 310. The cover 302 also includes a cover bore 714 extending from the open second end of the cover 306 to the closed second end 304 of the cover. FIG. 8 shows a cover 302 end view, as viewed from the cover first end 306, with bore 714, and cover outer surface 708.

Figure 9:
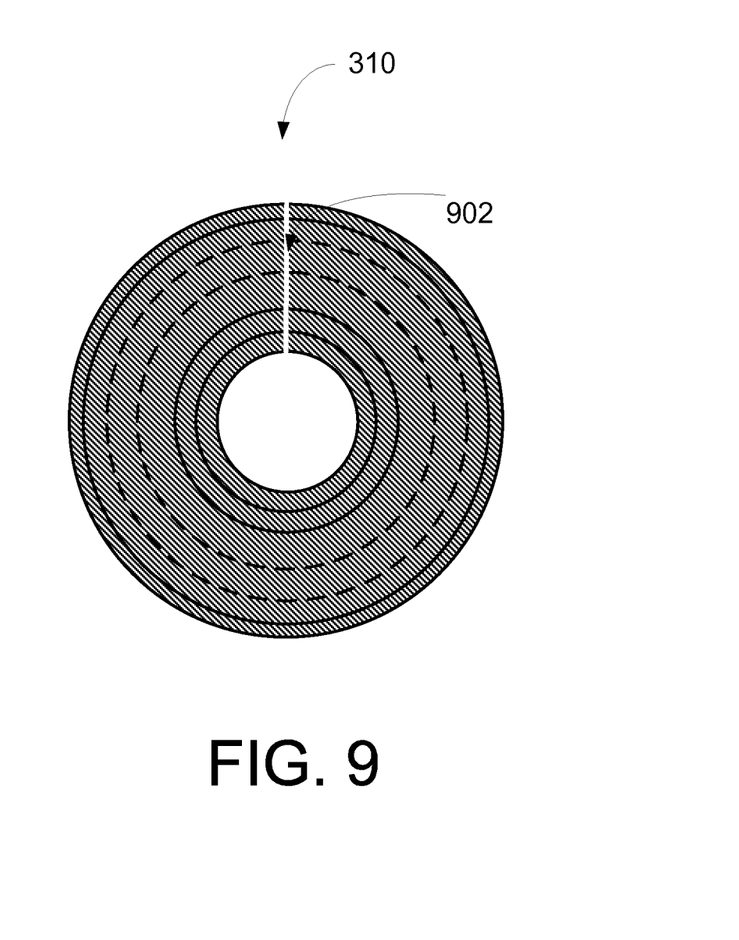
FIG. 9 is a second end view of the plug, according to an optional example embodiment of the invention.

FIG. 9 shows an example embodiment of the invention where the plug 310 may comprise a radial slit 902 running through the length of the plug body and extending from the plug first end 312 to the plug second end 314. The slit may extend radially with respect to the longitudinal axis 514, but only penetrate one side of the plug body such that the plug 310 may be temporarily opened up to allow cordage 320 to pass into the bore 512 from the side of the plug, and so that the plug may then surround the cordage 320 without having to install the plug on the cordage before installing the connector 308. In such an embodiment, the sealing aspects of the plug may be compromised, but the clamp 318 may be utilized to at least partially compress and re-seal the slit near the plug second end 314. In example embodiments, the cover 302, which may form an interference fit 402 with the plug 310, may also at least partially compress and re-seal the slit near the plug first end 312.

Figure 10:
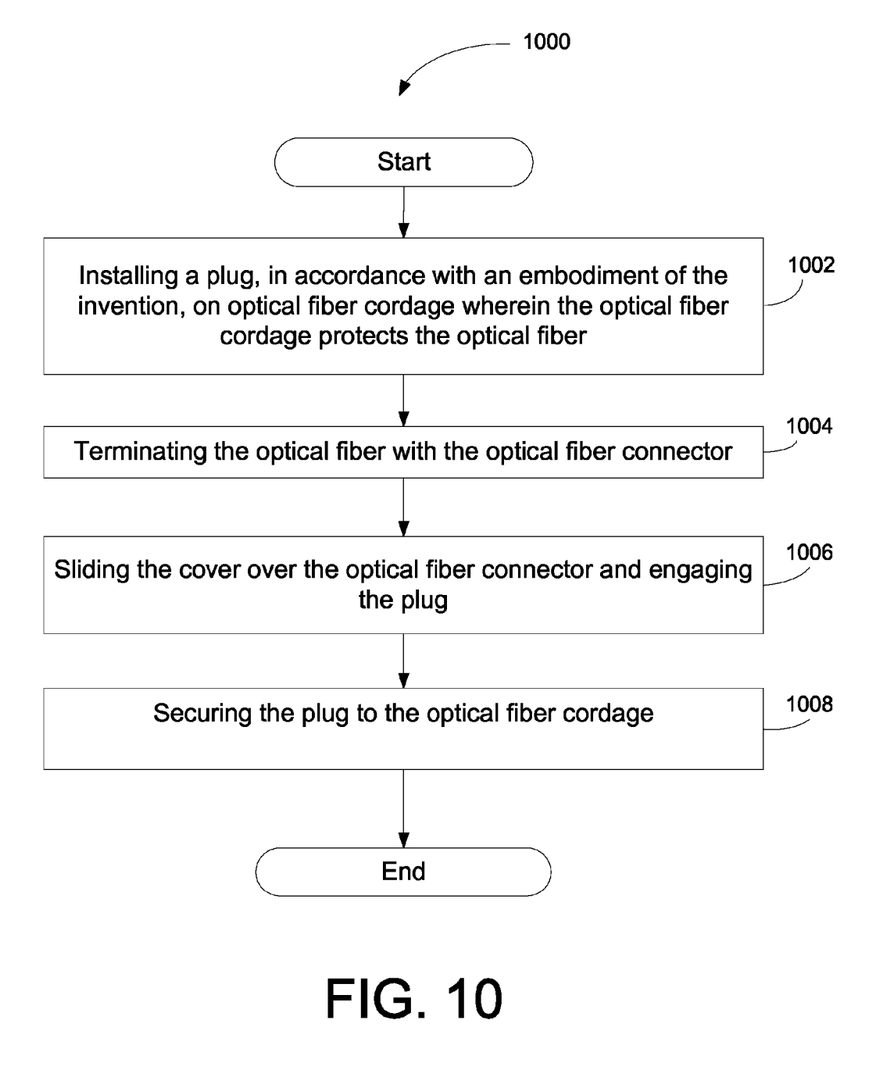
FIG. 10 is a flow diagram of an example method, according to an example embodiment of the invention.

An example method 1000 for assembling a connector cover to protect an optical fiber connector will now be described with reference to the flowchart of FIG. 10. The method starts in block 1002. According to an example embodiment a plug is installed on optical fiber cordage, wherein the optical fiber cordage protects an optical fiber. For illustrative purpose, the plug 310 comprises a plug first end 312, a plug second end 314, a bore 512 extending through the plug 310 from the plug first end 312 to the plug second end 314, and a cover mating surface 315 adjacent to the plug first end 312, wherein the cover mating surface 315 is operable to slidingly engage a cover 302, which, according to example embodiments, may be made of a rubber material. In block 1004, the optical fiber 322 may be terminated with the optical fiber connector 308. In block 1006, the cover 302 may slide over the optical fiber connector 308 and may engage the plug 310. In block 1008, the plug 310 may be secured to the optical fiber cordage 322. The method ends after block 1008.

Accordingly, example embodiments of the invention can provide the technical effects of creating certain apparatuses, systems, and methods that provide a cover that may securely protect an optical fiber connector. Example embodiments of the invention can provide the further technical effects of providing a cover that may be easy to remove, when desired. Furthermore, when a particular unit on the premises is ready for service installation, the plug may then be slid down the cordage into the installation hole, where it may help seal the installation hole. Since no tape is used, example embodiments of the invention can provide the further technical effects avoiding adhesive residue on the cordage or connector after the cover assembly is removed.

As desired, embodiments of the invention may include the disassembled connector cover assembly 300 or the assembled connector cover assembly 400 with more or less of the components illustrated in FIGS. 3 and 4.

While the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose the invention, including the best mode, and to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. An assembly comprising:
    an elongated hollow cylindrical cover having a closed first end, and an open second end; and
    a plug comprising an elastomeric material, the plug further comprising:
        a plug first end;
        a plug second end;
        a bore extending through the plug from the plug first end to the plug second end;
        a clamp surface adjacent to the plug second end;
        a cover mating surface adjacent to the plug first end; and
        a flange disposed between the plug first end and the plug second end, the flange disposed around a circumference of extending out from an outer surface of the plug and having a diameter greater than a diameter of the cover mating surface and a diameter of the clamp surface, wherein the flange defines a boundary between the clamp surface and the cover mating surface,
        wherein the cover mating surface is operable to slidingly engage the cover and mate with and securely seal the open send end of the cover by an interference fit, and
        wherein the plug is operable to surround and slidingly engage optical fiber cordage extending through the bore.

2. The assembly of claim 1, further comprising a clamp for sealably securing the plug to the optical fiber cordage.

3. The assembly of claim 1, wherein the flange positioned approximately mid-way between the plug first end and the plug second end.

4. The assembly of claim 1, wherein the plug further comprises a radial slit through the length of the plug and extending from the plug first end to the plug second end.

5. The assembly of claim 1, further comprising optical fiber cordage, a connector, and an optical fiber, wherein the optical fiber cordage is operable to protect the optical fiber and the connector terminates the optical fiber, wherein the cover is operable to slidingly protect the connector.

6. The assembly of claim 5, wherein the plug, is further operable to engage with and seal an installation hole, wherein the optical fiber cordage and the connector may pass through the installation hole.

7. A system comprising:
    an optical fiber;
    optical fiber cordage protecting the optical fiber;
    an optical fiber connector terminating the optical fiber;
    an elongated hollow cylindrical cover having a closed first end and an open second end, and operable to surround the optical fiber connector; and
    a plug comprising an elastomeric material, the plug further comprising:
        a plug first end;
        a plug second end;
        a bore extending through the plug from the plug first end to the plug second end;
        a clamp surface adjacent to the plug second end;
        a cover mating surface adjacent to the plug first end; and
        a flange disposed between the plug first end and the plug second end, the flange disposed around a circumference of extending out from an outer surface of the plug and having a diameter greater than a diameter of the cover mating surface and a diameter of the clamp surface, wherein the flange defines a boundary between the clamp surface and the cover mating surface, wherein the cover mating surface is operable to slidingly engage the cover and mate with and securely seal the open second end of the cover by an interference fit, and wherein the plug is operable to surround and slidingly engage the optical fiber cordage extending through the bore.

8. The system of claim 7, wherein the plug is further operable to securely and sealably mate with the optical fiber cordage extending through the bore.

9. The system of claim 7, further comprising a clamp for sealably securing the plug to the optical fiber cordage, wherein the clamp comprises one of a cable tie, bolt clamp, snap grip clamp, spring clamp, or hose clamp.

10. The system of claim 7, wherein the plug further comprises a radial slit through the length of the plug and extending from the plug first end to the plug second end.

11. The system of claim 7, wherein the flange is positioned approximately mid-way between the plug first end and the plug second end.

12. The system of claim 7, wherein the plug, is further operable to engage with and seal an installation hole, wherein the optical fiber connector and the optical fiber cordage may pass through the installation hole.

13. The system of claim 7, wherein the plug comprises an elastomeric material having a Shore A hardness ranging from about 30 to about 80.

14. The assembly of claim 1, wherein the cover mating surface comprises a smooth outer surface having an outer diameter; and wherein the cover comprises a smooth inner surface disposed inside the hollow cylindrical cover and adjacent the open second end, the smooth inner surface having an inner diameter.

15. The assembly of claim 14, wherein the cover mating surface is operable to slidingly engage the cover by the smooth inner surface of the cover contacting and expanding about the smooth outer surface of the cover mating surface.

16. The assembly of claim 14, wherein the outer diameter of the smooth outer surface of the cover mating surface is greater than the inner diameter of the smooth inner surface of the cover.

17. The assembly of claim 1, wherein the cover mating surface comprises a first outer diameter, wherein the clamp surface includes a second outer diameter;

wherein the flange includes a third outer diameter, a first end disposed adjacent the cover mating surface, and a second opposing end disposed adjacent the clamp surface;

wherein the third outer diameter is greater than the first outer diameter and the second outer diameter and wherein the first outer diameter is greater than the second outer diameter.

18. The system of claim 7, wherein the cover mating surface comprises a smooth outer surface having an outer diameter; and wherein the cover comprises a smooth inner surface disposed inside the hollow cylindrical cover and adjacent the open second end, the smooth inner surface having an inner diameter.

19. The system of claim 15, wherein the cover mating surface is operable to slidingly engage the cover by the smooth inner surface of the cover contacting and expanding about the smooth outer surface of the cover mating surface.

20. The system of claim 15, wherein the outer diameter of the smooth outer surface of the cover mating surface is greater than the inner diameter of the smooth inner surface of the cover.

21. The system of claim 7, wherein the cover mating surface comprises a first outer diameter;

wherein the clamp surface includes a second outer diameter;

wherein the flange includes a third outer diameter, a first end disposed adjacent the cover mating surface, and a second opposing end disposed adjacent the clamp surface;

wherein the third outer diameter is greater than the first outer diameter and the second outer diameter and wherein the first outer diameter is greater than the second outer diameter.

22. An assembly comprising:

an elongated hollow cylindrical cover having a closed first end, and an open second end; and a plug comprising an elastomeric material the plug further comprising a plug first end;

a plug second end;

a bore extending through the plug from the plug first end to the plug second end;

a cover mating surface adjacent to the plug first end; and a radial slit through the length of the plug and extending from the plug first end to the plug second end, wherein the cover mating surface is operable to slidingly engage the cover, and wherein the plug is operable to surround and slidingly engage optical fiber cordage extending through the bore.

* * * * *